United States Patent [19]

Critchfield et al.

[11] Patent Number: 5,364,906
[45] Date of Patent: Nov. 15, 1994

[54] LOW VISCOSITY POLYMER POLYOLS WITH IMPROVED DISPERSION STABILITY

[75] Inventors: Frank E. Critchfield, South Charleston; Donald W. Simroth, Charleston, both of W. Va.; Stuart L. Watson, Midlothian, Va.

[73] Assignee: Arco Chemical Technology, L.P., Greenville, Del.

[21] Appl. No.: 109,777

[22] Filed: Aug. 20, 1993

[51] Int. Cl.$^5$ .............................................. C08F 283/02
[52] U.S. Cl. .................................... 525/53; 525/54; 525/404; 525/412; 528/392
[58] Field of Search ............... 524/765, 728, 386, 388, 524/389; 525/53, 54, 404, 412; 528/392

[56] References Cited

U.S. PATENT DOCUMENTS

| | | |
|---|---|---|
| Re. 28,715 | 2/1976 | Stamberger . |
| Re. 29,118 | 1/1977 | Stamberger . |
| 4,148,840 | 4/1979 | Shah . |
| 4,208,314 | 6/1980 | Priest et al. . |
| 4,242,249 | 12/1980 | Van Cleve et al. . |
| 4,652,589 | 3/1987 | Simroth et al. . |
| 4,837,246 | 6/1989 | Gastinger et al. . |
| 4,837,247 | 6/1989 | Gastinger et al. . |

FOREIGN PATENT DOCUMENTS 365986  5/1990  European Pat. Off. .

OTHER PUBLICATIONS

CA Selects: Synthetic High Polymers, 1988, Issue 11, p. 11.

*Primary Examiner*—Joseph L. Schofer
*Assistant Examiner*—Jeffrey T. Smith
*Attorney, Agent, or Firm*—Dennis M. Kozak; David L. Mossman

[57] ABSTRACT

The present invention provides polymer polyols and a method for preparing polymer polyols which have (1) exceptional dispersion stability, especially at high styrene contents, and (2) substantially smaller particle sizes than polymer polyols having equivalent viscosity. In a preferred embodiment of the present invention, a first reaction product is obtained by feeding the following materials to a first continuous reactor in the presence of a free radical initiator or catalyst: (a) less than about 50 wt % of a total monomer proportion or monomer mixture, preferably comprising styrene/acrylonitrile at a ratio preferably greater than about 50/50 wt %; (b) at least about 50 wt % of a total base polyol proportion; (c) a majority of a precursor stabilizer; and, (d) a polymer control agent (PCA). The product from this first reaction then is again fed through a continuous reactor, which may be the same as the first reactor, along with additional initiator, at least about 50% of the total monomer proportion, and, optionally, any balance of the total base polyol proportion, precursor stabilizer, and PCA. The product from this second reactor is a high stability, low viscosity polymer polyol.

15 Claims, No Drawings

LOW VISCOSITY POLYMER POLYOLS WITH IMPROVED DISPERSION STABILITY

BACKGROUND OF THE INVENTION

1. Field of the Invention

The present invention relates to polymer polyols, to methods of making polymer polyols, and to polyurethanes made from such polymer polyols.

2. Background

Polymer polyols commonly are used to produce polyurethane foams. Basically, polymer polyols are produced by polymerizing one or more ethylenically unsaturated monomers dissolved or dispersed in a polyol in the presence of a free radical catalyst to form a stable dispersion of polymer particles in the polyol. Polymer polyols are valuable because they can produce polyurethane foam which has high load-bearing properties.

The first commercially accepted polymer polyols primarily were produced using acrylonitrile monomer, and had a somewhat higher viscosity than desired for some applications. More recently, polymer polyols of lower viscosity have been produced using acrylonitrile-styrene monomer mixtures.

Polyurethane foams made from polymer polyols have a wide variety of uses. The two major types of polyurethane foam generally are slabstock and molded foam. Slabstock foam made using polymer polyols typically is used in the carpet, furniture, and bedding industries. The primary type of molded foam, generally termed high resiliency (HR) molded foam, is used widely in the automotive industry for applications ranging from molded seats to energy-absorbing padding and the like.

The wide demand for polyurethane foams has spawned a need for polymer polyols that can produce foams having a wide variety of characteristics. For example, a demand exists for slabstock foam that is virtually scorch-free. It also is desirable for these scorch-free foams to have low density (viz.—1.5 pounds per cubic foot or less) while maintaining satisfactory load-bearing and other foam properties. One way to produce such a foam is to use a monomer mixture having a high styrene content (e.g., about 65 to 70 percent styrene).

The preparation of polymer polyols using a monomer mixture with a high styrene content creates difficulties. For example, the commercial processability of a particular polymer polyol depends upon its stability against phase separation, or its stability against the polymer particles settling out of the polyol medium. Many applications require rigorous stability, which becomes more difficult to achieve when high styrene content monomer mixtures are employed. It has been found that a higher stability polymer polyol may be obtained if the components used to make the polymer polyol are not fed to the reactor all at once. For example, U.S. Pat. No. 4,148,840 to Shah attempts to improve the stability of a polymer polyol by adding only a minor portion of a preformed polymer polyol to the base polyol along with the monomers and initiators. Another approach is seen in U.S. Pat. No. 4,242,249 to Van Cleve, et al., which is directed to the polymerization of an unsaturated macromonomer with other monomers to form a non-aqueous dispersion stabilizer which may be used in small amounts, 5% or less, to stabilize a polymer dispersion.

Other polyurethane foams that are in demand are foams that have high load-bearing capacities. A high load bearing capacity is particularly desirable in the slabstock area. The load-bearing capacity of a foam may be increased by increasing the polymer or solids content of the polymer polyol; however, as the solids content of the polymer polyol increases, the stability of the polymer polyol tends to decrease.

The trend toward the use of polymer polyols having a high styrene monomer mixture and a high solids content has resulted in polymer polyols that sometimes have a higher viscosity than desired. The viscosity of a polymer polyol must be low enough for ease in handling during manufacture and transport. At the same time, the stability of the polymer polyol must be high enough for use in the sophisticated, high-speed, large-volume equipment, machines, and systems now used to handle, mix, and react polyurethane-forming ingredients. Most importantly, the particles in the polymer polyol must be small enough to avoid plugging the filters, pumps, etc., used in such equipment.

Two basic types of processes have been used to produce polymer polyols-continuous processes and semi-batch processes. In a continuous process, the monomers, polyols, and initiator(s) typically are fed continously to a back mixed, stirred reactor in a manner that minimizes the monomer to polyol ratio. A continuous process tends to minimize settling of the vinyl polymer, and can produce a wide range of polymer polyols with acceptable dispersion stability.

In a semi-batch process, the vinyl monomers are fed slowly to a partially charged, agitated reactor to avoid excess free monomer concentration at any time during the polymerization. A semi-batch process is more difficult to control than a continuous process, which can achieve a steady state after line-out.

An example of a semi-batch process is found in European Patent No. 0 365 986, in which a semi-batch process is used to form graft copolymer dispersions. In order to form the graft copolymer dispersion, a graft polyol having 30% or less solids content is formed in a continuous process. The graft polyol product then is used as seed in the semi-batch process to produce graft polyols having 30% or more solids content and having a broad particle size distribution.

Even with the advanced state of the art in polymer polyol technology, there is a need for further improvement of polymer polyols to enhance their dispersion stability, to minimize their viscosity at higher solids levels, and to minimize the particle size of the polymers in the polyol.

SUMMARY OF THE INVENTION

The present invention provides polymer polyols and a method for preparing polymer polyols which have (1) exceptional dispersion stability, especially at high styrene contents, and (2) substantially smaller particle sizes than polymer polyols having equivalent viscosity. In a preferred embodiment of the present invention, a first reaction product is obtained by feeding the following materials to a first reactor-preferably a continuous, stirred, back-mixed reactor-in the presence of a free radical initiator or catalyst: (a) less than about 50 wt % of a total monomer proportion or monomer mixture, preferably comprising styrene/acrylonitrile at a ratio preferably greater than about 50/50 wt %; (b) at least about 50 wt % of a total base polyol proportion; (c) a majority of a precursor stabilizer; and, (d) a polymer control agent (PCA). The product from this first reaction then is fed through at least one more reactor (also preferably a continuous, stirred, back mixed reactor, which may be the same or a different reactor than was used in the first reaction), along with additional initiator, the remainder of the total monomer proportion, and, optionally, any balance of the base polyol proportion, precursor stabilizer, and PCA.

DETAILED DESCRIPTION OF THE INVENTION

In a preferred embodiment of the present invention, a minority of the total monomer proportion, preferably less than 50 wt %, and more preferably about 33 wt % or less, is fed to a "first" continuous reactor along with the requisite amount of free radical initiator or catalyst. At least about 5 wt % of the total monomer proportion should be added to the first reactor. Along with the monomer is fed a majority of the polyol, the precursor stabilizer, and the polymer control agent.

One or more reactors may be used in the present invention, the first two of which, either separately or in series, preferably should be a continuous, stirred, back-mixed reactor. The foregoing components are pumped into the first reactor continuously through an in-line mixer to assure complete mixing of the components before they enter the reactor. The internal temperature of the reactor preferably is controlled within a range of about 100° C.–140° C., more preferably about 110°–130° C. The contents of the reactor are well mixed with a residence time of at least 5 minutes, preferably greater than 10 minutes. The product of the first reactor is collected as it flows continuously out the top of the reactor through a back pressure regulator, which preferably has been adjusted to give some positive back-pressure in the reactor.

The product of this "first" reactor then is fed to a "second" reactor. The balance of the monomer, the free radical initiator or catalyst, the precursor stabilizer, the polymer control agent, and the polyol are fed to the second reactor along with the product from the first reactor. This "second" reactor may be a separate reactor, or it may simulate a second reactor, i.e., by feeding the product from the first reactor back to the first reactor. Either way, this second feed is treated using substantially the same conditions already described with respect to the first reactor. In the following examples, a portion of the product from this "second" reactor was stripped of residual monomer by vacuum stripping at about 2 millimeters absolute pressure and 120 to 130 degrees Centigrade for testing.

The percent by weight of polymer in the resulting polymer polyol may be determined from an analysis of the amount of unreacted monomers in the crude product before stripping. The product of the "second" reactor either may be used as is, or it may be fed to a "third" reactor to increase residence time, thereby increasing conversion of the reactants to polymer.

A preferred monomer for use in the present invention is a mixture of acrylonitrile/styrene (hereinafter sometimes called A/S) at a ratio preferably less than about 50/50 wt %. Other commonly used ethylenically unsaturated monomers may be used, alone or together with styrene and/or acrylonitrile. For example, suitable monomers include, but are not limited to, butadiene; isoprene; 1,4-pentadiene; 1,6-hexadiene, 1,7-octadiene; acrylonitrile; methacrylonitrile; α-methyl styrene; methylstyrene; 2,4-dimethylstyrene; ethyl styrene; isopropylstyrene; butylstyrene; substituted styrenes such as cyanostyrene; phenylstyrene; cyclohexylstyrene; benzylstyrene; nitrostyrene; N,N-dimethylaminostyrene; acetoxystyrene; methyl 4-vinylbenzoate; phenoxystyrene; p-vinyl diphenyl sulfide; p-vinylphenyl phenyl oxide; acrylic and substituted acrylic monomers such as acrylic acid; methacrylic acid; methyl acrylate; 2-hydroxyethyl acrylate; 2-hydroxyethyl methacrylate; methyl methacrylate; cyclohexyl methacrylate; benzyl methacrylate; isopropyl methacrylate; octyl methacrylate; ethyl α-ethoxyacrylate; methyl α-acetoaminoacrylate; butyl acrylate; 2-ethylhexyl acrylate; phenyl acrylate; phenyl methacrylate; N,N-dimethylacrylate; N,N-dibenzylacrylamide; N-butylacrylamide; methacrylyl formamide; vinyl esters; vinyl ethers; vinyl ketones; vinyl acetate; vinyl alcohol; vinyl butyrate; isopropenylacetate; vinyl formate; vinyl acrylate; vinyl methacrylate; vinyl methoxy acetate; vinyl benzoate; vinyl toluene; vinyl naphthalene; vinyl methyl ether; vinyl ethyl ether; vinyl propyl ether; vinyl butyl ether; vinyl 2-ethylhexyl ether; vinyl phenyl ether; vinyl 2-methoxyethyl ether; methoxybutadiene; vinyl 2-butoxyethyl ether; 3,4-dihydro-1,2-pyran; 2-butoxy-2'-vinyl diethyl ether; vinyl 2-ethylmercaptoethyl ether; vinyl methyl ketone; vinyl ether ketone; vinyl phenyl ketone; vinyl ethyl sulfide; vinyl ethyl sulfone; N-methyl-N-vinyl acetamide; N-vinylpyrrolidone; vinyl imidazole; divinyl sulfide; divinyl sulfoxide; divinyl sulfone; sodium vinyl sulfonate; methyl vinyl sulfonate; N-vinyl pyrrole; dimethyl fumarate; dimethyl maleate; maleic acid; crotonic acid; fumaric acid; itaconic acid; monomethyl itaconate; t-butylaminoethyl methacrylate; glycidyl acrylate; allyl alcohol; glycol monoesters of itaconic acid; vinyl pyridine; maleic anhydride; maleimide; N-substituted maleimides; such as N-phenylmaleimide and the like.

A preferred initiator for use in the invention is 2,2'azobis(iso-butyronitrile) ("AIBN"). However, any catalyst commonly employed for addition polymerization may be used, e.g., the free radical type of vinyl polymerization catalysts, such as the peroxides, persulfates, percarbonates, azo compounds, and the like. Other specific examples besides AIBN include, but are not limited to, dibenzoyl peroxide; lauroyl peroxide; di-t-butyl peroxide; diisopropyl peroxy carbonate; t-butyl peroxy-ω-ethylhexanoate; t-butylperpivalate; 2,5-dimethyl-hexane-2,5-di-per-2-ethyl hexoate; t-butylperneodecanoate; t-butylperbenzoate; t-butyl percrotonate; t-butyl perisobutyrate; di-t-butyl perphthalate; 2,2'-azobis(2-methylbutanenitrile) for example. Other suitable catalysts may be employed, of course. The wt % of the free radical initiator or catalyst in the feed to both the first and second reactors may range between about 0.1 to 5.0 wt %, preferably between about 0.3–0.8 wt %. A chain transfer agent such as dodecylmercaptan also may be added.

The polyol used in the present invention may be a polyoxyalkylene polyether polyol having a molecular weight of from about 500 to 15,000, preferably from about 2000 to 10,000. Such polyols typically are made by the reaction of an initiator or starting material having a plurality of reactive hydrogens thereon with one or more alkylene oxides. Ethylene oxide, propylene oxide, butylene oxide and mixtures of these may be used. Often, a mixture of ethylene oxide and propylene oxide is preferred. The resulting polyols can range from having predominantly primary to predominantly secondary hydroxyl groups. In one embodiment, at least 50 wt % of the total base polyol proportion is added to the first reactor, the balance being added to the second reactor. Preferably at least 75 wt % of the polyol is added to the first reactor, and most preferably, all of it (100 wt %) is added to the first reactor.

Suitable starting materials or initiators for the polyol include, but are not limited to, di, tri- or tetra-hydric initiators, such as glycerin, alkanolamines, alkylamines, aryl or aromatic amines, sucrose, sorbitol, trimethylol propane (TMP) α-methylglucoside, β-methylglucoside or other methylglucoside, resins of phenol, aniline and mixed phenol aniline, such as methylenedianiline or bisphenol A, Mannich condensates and mixtures thereof, for example. The polyol may be made by alkoxylating the initiator with a desired number of moles of an alkylene oxide. Preferably, the alkylene oxide has two to four carbon atoms, and is thus ethylene oxide, propylene oxide, butylene oxide or mixtures of these oxides. The oxides may be mixed upon addition, or may be added to the polyol initiator chain separately to form blocks or caps. The alkoxylation generally is catalyzed; KOH is a commonly used catalyst, although others may be employed. For example, double metal cyanide catalysts may be employed, in particular zinc hexacyanocobaltate, and the polyols may be prepared in accordance with the methods described in U.S. Pat. Nos. 3,029,505; 3,900,518; 3,941,049; and 4,355,100, incorporated herein by reference.

A preferred polyol for use in the invention is a product made by reacting propylene oxide, then ethylene oxide, or ethylene oxide and propylene oxide, then additional propylene oxide, successively, with glycerine in the presence of potassium hydroxide catalyst, and refining the product of said reaction to remove the catalyst. The resulting polyol (Polyol I) contains 10% ethylene oxide and has a hydroxyl number of about 52. Another preferred polyol is obtained by reacting propylene oxide and ethylene oxide, successively, with a polyhydric initiator such as glycerine in the presence of potassium hydroxide or another suitable catalyst and refining the product to remove the catalyst. The resulting polyol (Polyol II) contains 16.5 weight percent ethylene oxide and has a hydroxyl number of 35.5.

Precursor stabilizers may be used, if desired, in the preparation of the polymer polyols of this invention to assist in imparting desired stability to the resulting polymer polyols. Suitable precursor stabilizers are, in general, prepared by the reaction of the selected reactive unsaturated compound with the selected polyol.

The terminology "reactive unsaturated compound," refers to any compound capable of forming an adduct with a polyol, either directly or indirectly, and having carbon-to-carbon double bonds which are adequately reactive with the particular monomer system being utilized. More specifically, compounds containing alpha, beta unsaturation are preferred. Suitable compounds satisfying this criteria include the maleates, fumarates, acrylates, and methacrylates. While not alpha, beta unsaturated compounds, polyol adducts formed from substituted vinyl benzenes such as chloromethylstyrene likewise may be utilized. Illustrative examples of suitable alpha, beta unsaturated compounds which may be employed to form the precursor stabilizer include maleic anhydride, fumaric acid, dialkyl fumarates, dialkyl maleates, glycol maleates, glycol fumarates, isocyanatoethyl methacrylate, 1,1-dimethyl-m-isopropenyl-benzyl-isocyanate, methyl methacrylate, hydroxyethyl methacrylate, acrylic and methacrylic acid and their anhydride, methacroyl chloride and glycidyl methacrylate.

With respect to the polyol reactant, any of the polyol types used for the base polyol may be employed. It is preferred to utilize polyoxyalkylene polyols. The molecular weight of the polyol should be relatively high, preferably above about 4000 (number average) and, more preferably, at least about 4500. However, polyols having molecular weights of no less than about 3000 may be utilized if desired.

The level of ethylenic unsaturation in the precursor stabilizer may vary widely. The minimum and maximum levels of unsaturation both are constricted by the dispersion stability that the precursor stabilizer is capable of imparting to the polymer polyol composition. On the one hand, the minimum level of unsaturation is the level sufficient to permit the precursor stabilizer to assist in the dispersion stability of the polymer polyol. Typically, the lower limit of unsaturation is about 0.03 or so milliequivalents per gram of precursor.

On the other hand, the maximum level is constricted by crosslinking of the precursor stabilizer which may occur. More particularly, when higher levels of unsaturation are attempted to be added in preparing the precursor stabilizer, there is a greater probability that species will be formed having more than one double bond per molecule. An undue population of such specie may cause crosslinking and thus may adversely affect the ability of the stabilizer to provide the requisite dispersion stability enhancement, and also may substantially increase the viscosity. Accordingly, the maximum level of unsaturation added should be below that at which significant crosslinking occurs, that is, on the average no more than about one carbon-to-carbon double bond per molecule of precursor stabilizer should occur.

The specific level of unsaturation utilized further will depend on the molecular weight of the polyol used to prepare the precursor stabilizer and on the viscosity of the precursor stabilizer itself. Thus, from less than about 0.02 milliequivalents per gram of precursor up to about 0.15, or perhaps up to about 0.20 or more may be used. More particularly, unsaturation levels of at least about 0.04 or 0.05, up to about 0.10 or so are particularly suitable.

It is preferred to prepare the precursor stabilizer in such a fashion that the unsaturation is retained to the extent possible. The use of such precursor stabilizers particularly are useful in improving polymer polyol stability.

Loss of unsaturation may occur in precursor stabilizer preparation with any of the alpha, beta unsaturated compounds. For example, it has been recognized that when maleic anhydride is employed, anywhere from about 25 percent to essentially all of the unsaturation may be lost. Loss of unsaturation generally appears to be accompanied by an increase in viscosity of the precursor stabilizer. Accordingly, it is desirable to utilize an efficient process in the preparation of the precursor such that at least half of the added unsaturation is retained.

Preferably, the unsaturation is of the fumarate type. Thus, it is preferred to utilize a compound having fumarate-type unsaturation or an unsaturated compound which, under the reaction conditions used in forming the adduct, the polyol will form a high proportion of fumarate-type unsaturation. Likewise, under appropriate conditions, maleate-type unsaturation can be isomerized to fumarate, as is known.

The formation of the precursor stabilizer using maleic anhydride may be carried out at elevated temperatures using appropriate catalysts. It has been found satisfactory to maintain the ratio of the maleic anhydride to polyol in the range of from about 0.5 to perhaps about 1.5 moles of maleic anhydride per mole of polyol, more preferably 0.75 to about 1.00 mole per mole of polyol.

The precursor stabilizer preferably is prepared in the presence of a catalytic amount of a strong base. Suitable bases include inorganic bases such as alkali and alkaline earth metal hydroxides and the weak acid salts of alkali and alkaline earth metals, and organic bases such as quaternary ammonium hydroxides, 4-dimethylaminopyridine, 4-pyrrolidinopyridine, and imidazole. Potassium hydroxide has been found to be useful. The amount of catalyst is not critical; and may, for example, be as low as about 6 p.p.m. or even less when potassium hydroxide is used.

Suitable reaction temperatures may vary from about 100° to 125° C. or so up to about 180° C., or even higher. Desirably, the reaction should be carried out in a reactor capable of agitation and subsequent pressurization. It is necessary to introduce an alkylene oxide, preferably ethylene or propylene oxide, either with the other reactants or subsequently, which is reacted with the adduct until the acid number is below at least about 3.0, preferably below about 1.0. The product then may be cooled and stripped to remove excess alkylene oxide and then is ready for use in preparing polymer polyols.

When maleic anhydride is employed, precursor stabilizers having adequate viscosities can be prepared by utilizing catalytic amounts (e.g., 20 parts per million or so) of a strong base such as potassium hydroxide. This will likewise allow retention of about 50 percent of the unsaturation, with up to about 70 percent or so of the unsaturation being of the fumarate type under appropriate reaction times and conditions. Viscosities of about 3000 cks. (25° C.) or so typically are provided.

The maximum viscosity of useful precursor stabilizers typically will be dictated by practical considerations. More specifically, the viscosity of the precursor stabilizer should not be so high that it cannot be conveniently handled. Viscosities up to perhaps 10,000 to 15,000 cks or so should be capable of being satisfactorily handled. Moreover, by blending with base polyol in the reactor used to form the precursor stabilizer, even substantially higher viscosities (e.g., up to 25,000 to 30,000 cks. or higher) should be suitable.

Precursor stabilizers employing polyoxypropylene oxide addition products with starters having functionalities equal to or in excess of 3 are preferred, although starters having lower functionalities are acceptable. A variety of tetrols and higher functionality starters are well known and may be used. Mixtures likewise may be employed. It is particularly preferred to use sorbitol as a starter. Such precursor stabilizers further are characterized by an hydroxyl number of about 28, unsaturation of the fumarate type and a level of unsaturation of about 0.06 or even 0.05 or so, to 0.1 milliequivalents unsaturation or so per gram of polyol. The precursor stabilizer accordingly may be made by reacting the sorbitol-initiated polyol with maleic anhydride in the presence of potassium hydroxide catalyst. This may be accomplished by using a temperature of about 125° C. to preserve a high proportion of the charged (i.e.—added) unsaturation. The maleate unsaturation then may be isomerized to fumarate using morpholine as is well known. Alternatively, higher temperatures (e.g. —175° to 180° C. or so) may be utilized to achieve relatively high levels of fumarate-type unsaturation directly. The techniques involved are well known and may be used as desired.

The use of the preferred precursor stabilizers offers several advantages. The use of high functionality starters, such as, for example, sorbitol, provide highly effective, yet relatively low viscosity, precursor stabilizers, which, in turn, allows the polymer polyol viscosity to be minimized. Similarly, stability of precursor stabilizers can be problematical, sometimes resulting in marked viscosity increases upon usage. This well may be due to reaction of precursor stabilizer molecules with each other. The utilization of propylene oxide-capped precursor stabilizers substantially minimizes this problem.

A stabilizer, as previously described, may be added to the base polyol in an amount sufficient to provide the desired stability assistance for the resulting polymer polyol. Generally, it will be suitable to incorporate a stabilizer in amounts up to perhaps about 20 percent or so, based upon the weight of the polyol. Levels from about 3 to 5 percent to about 17 percent by weight or so generally should be satisfactory for slabstock applications, while levels of about 12 percent by weight or less should be suitable for polymer polyols used in high resiliency molded foam applications. If desired, a mixture of stabilizers can, of course, be used.

Preferred precursor stabilizers for use in the invention are an adduct of an unsaturated compound with a polyol, the product of which contains unsaturation that readily copolymerizes with either styrene and/or acrylonitrile. A preferred precursor stabilizer for use in the present invention ("Stabilizer A") is made by reacting a 34 hydroxyl number, 15 weight percent ethylene oxide capped polyoxypropylene triol with maleic anhydride and subsequently with ethylene oxide. The resulting precursor stabilizer has a hydroxyl number of 32, an unsaturation of 0.1 meq/gm, with the unsaturation being 30/70 maleate/fumarate, the retained unsaturation being 50 percent of the unsaturation added with the maleic anhydride.

For a given polymer polyol system, adjustment of the process variables to provide the desired polymer cross-linking coefficient and intrinsic viscosity can result in polymer polyol compositions having higher than the indigenous viscosity for the particular system, viz.—the minimum product viscosity for a given polymer polyol composition made under the particular reaction conditions. This may occur, for example, where the level of the polymer control agent having at least moderate chain transfer activity (e.g.—isopropanol) is minimized in order to achieve the desired polymer intrinsic viscosity. The desired product viscosity of such polymer polyol compositions thus can be significantly higher than the indigenous viscosity for the system.

It has been discovered that product viscosities of essentially the indigenous system viscosity can be provided by either of two general methods. For example, suitable treatment can result in reduction in a product viscosity from about 5,000 centipoise to about 4,000 centipoise or so, the latter considered to be the indigenous system viscosity. This reduction in product viscosity is accompanied by an observed change in the somewhat rough surfaces of the polymer particles to a predominance (i.e.,—at least a majority) of particles appearing to have relatively smooth exteriors.

Thus, according to another aspect of the present invention, the polymerization of the monomers in the polyol is carried out in the presence of a polymer control agent having at most minimal chain transfer activity. Exemplary polymer control agents of this type include water, methanol, cyclohexane and benzene.

This preparative technique allows the polymer polyol to be prepared with what is considered to be its indigenous system viscosity. Yet, the polymer portion by use of this technique possesses a desirably low crosslinking coefficient and an acceptably high intrinsic viscosity. This is in sharp contrast to what occurs when the polymer control agent employed has moderate or high chain transfer activity. Under these latter circumstances, it generally is quite difficult to satisfy all three objectives. The reason for this surprising behavior when minimal chain transfer activity materials are used as the polymer control agent simply is not understood. Regardless, this technique is considered to be highly useful, providing a facile method for readily providing optimum characteristics for the polymer and for the polymer polyol product viscosity.

In accordance with a further aspect of this invention, the polymer polyol composition prepared with higher than its indigenous system viscosity may be subjected to a post treatment to increase the polymer particle fluidity sufficiently to concomitantly cause the desired reduction in product viscosity to essentially its indigenous system viscosity. This post treatment can be carried out by using a heat treatment, by using a solvating agent for the polymer particles, or by using a combination of the two.

The reduction in product viscosity resulting from the heat treatment is believed to be the result of lowering the melt viscosity of the polymer in the dispersed polymer particles to such an extent that the surface force (surface tension) associated with a particle is sufficient to cause the molten polymer in the particle to flow into the shape of lowest energy—a smooth sphere. Likewise, the use of a solvating agent, alone or in conjunction with a higher temperature, is believed to reduce the melt viscosity of the polymer in the particles by a plasticization mechanism, thereby enabling the polymer in the particle to flow towards a smooth spherical shape.

The general concept is to increase the fluidity of the polymer within the particles to obtain at least a predominance of smooth particles with a concurrent reduction in product viscosity. Any technique capable of increasing the fluidity of the polymer particles may be used in addition to the techniques discussed herein.

Obviously, it will be more desirable to carry out these viscosity reduction techniques in such a fashion that essentially the indigenous system viscosity is provided, due to the relative ease with which such techniques can be effected and the advantages derived from lower product viscosity polymer polyols. Likewise, it is within the scope of the present invention to carry out such techniques so that the product viscosity is reduced only to a point between the starting product viscosity and the indigenous system viscosity.

Use of a polymer control agent having significant chain transfer activity often tends to decrease the stability of the polymer polyol composition, apparently because of the competition during polymerization between the chain transfer agent and the grafting reaction between the growing polymer chain and the base polyol. Accordingly, it may be desirable to include in the polymerization reaction, a precursor stabilizer. The utilization of a precursor stabilizer seems to minimize the adverse effects caused by the use of this type of polymer control agent. The amount of the precursor stabilizer employed may be varied within wide limits. Functionally, the level used should be sufficient to adequately minimize adverse effects caused by using relatively high chain transfer activity polymer control agents. Typically, this may be achieved by using up to about 10 weight percent or so of the precursor stabilizer, based on the weight of the base polyol.

Preferred polymer control agents (PCA's) preferably are low molecular weight compounds that result in polymer polyols with crosslinking coefficients of less than 55. A preferred PCA used in the following examples is isopropanol ("ISOP"). Other suitable PCA's include, but are not limited to, water, methanol, cyclohexane, benzene, toluene, etc.

Polymer polyols produced according the present invention have inherently enhanced stability. Therefore, less precursor stabilizer is required, and the final viscosity of the polymer polyol is reduced.

The following procedures were used to analyze the polymer polyols made in the following examples:

CENTRIFUGABLE SOLIDS

After stripping unreacted monomer, the polymer polyol composition was centrifuged for about 24 hours at about 3000 revolutions per minute and 1470 radial centrifugal "g" force. The centrifuge tube then was inverted and allowed to drain for four hours. The nonflowing cake remaining at the bottom of the tube was reported as weight percentage of the initial weight of the composition tested.

CROSSLINKING COEFFICIENT (XLC)

This test determines the light transmission through a dispersion (or solution) of polymer polyol in dimethylformamide (DMF) in which one percent of the polymer is present. The dispersion (or solution) was transferred to one of two matched 1 cm transmission cells while the second matched cell was filled with DMF. A Bausch & Lomb Spectronic 710 spectrophotometer was used to measure the light transmission of the sample at 500 millimicrons after setting a reference cell containing only DMF to 100% transmission. This measurement was referred to as LT for light transmission.

The crosslinking coefficient (XLC) was calculated using the following formula:

$$XLC = 100 - LT$$

MEAN PARTICLE SIZE

The mean particle size was determined by a light scattering technique using a Leeds & Northrup MICROTRAC 7991-3 sub-MICRON Particle Size Analyzer with isopropanol as the diluent. The values were obtained at a material index of 016. This setting was used to compensate for the difference between the refractive index of the particles and the diluent using this Analyzer.

PREPARATION OF POLYURETHANE FOAMS

Polyurethanes may be made by reacting the polymer polyols described above with an organic polyisocyanate in the presence of a polyurethane formation catalyst. If a foam is desired, a blowing agent such as a halocarbon (trichlorofluoromethane, for example), water, or carbon dioxide, etc., also may be present. The polyurethane formation catalysts typically are tin catalysts or tertiary amine compounds. Other conventional additives such as silicone surfactants, fire retardant additives (melamine, for example), etc. also may be present. For more information related to parameters for use in preparing polyurethanes, particularly flexible polyurethanes, see U.S. Pat. No. 4,338,408; 4,342,687 and 4,381,353, incorporated herein by reference. Another preferred catalyst is a solution consisting of 70 wt % bis(2-dimethylaminoethyl) ether and 30 weight percent dipropylene glycol ("Catalyst A-1").

A typical free-rise slab polyurethane foam is prepared by first charging polymer polyol, water, catalyst and silicone surfactant into a vessel while stirring vigorously. Next, the polyisocyanate is added to the vessel with stirring, and the resulting mixture is immediately poured into a cardboard cakebox. Then, the polyurethane foam is allowed to rise and cure at room temperature. In the following examples, free rise foams were prepared from the Control polymer polyol and several of the polymer polyols identified in the Examples using the proportion of components shown in Table A.

TABLE A

| FREE RISE FOAM FORMULATION | |
|---|---|
| Components | Parts |
| Polymer polyol | 100 |
| Water | 2.3 |
| Catalyst A-1 | 0.05 |
| Stannous Octoate (tin catalyst) | 0.09–0.12 |
| Silicone Surfactant A* | 0.9 |
| 80/20 2,4/2,6 Tolylene Diisocyanate (110 index) | |

* "Silicone Surfactant A" may be obtained from Union Carbide as a product called "L-5750."

The polymer polyol, water, amine catalyst, and silicone surfactant were charged to a one/half gallon paper container equipped with a baffle assembly and mixed at 2400 rpm for 60 seconds with a 2.4-inch diameter, 4-blade turbine stirrer placed one inch above the bottom of the container. The mixture was allowed to set for 15 seconds to degas. Tin catalyst was added after degassing and mixing was re-initiated for ten seconds at 2400 rpm. Tolylene Diisocyanate (TDI) was added, and mixing was continued for five seconds. The mixture then was poured into a 14 in×14 in.×6 in. cardboard cake box. The foam mixture was allowed to rise freely until the reaction was complete. The foam then was placed in a convection oven preheated to 250 degrees F. for five minutes.

EXAMPLES

The following examples more clearly illustrate the advantages of the present invention. The results of these examples are shown in Table 1.

CONTROL

The Control polymer polyol used for comparison in the following examples was prepared in a single continuous, stirred, back-mixed reactor using the components shown in Table 1 and the same procedures as described above for the "first" reactor. The control polymer polyol was collected from the first reactor, stripped, as described above, and the percent by weight polymer in the polymer polyol was determined by analyzing the amount of unreacted monomers in the crude product before stripping.

EXAMPLES 1–3

In examples 1–3, the components shown in Table 1 were fed to two stirred, back-mixed reactors in series (simulated). The resulting product had improved dispersion stability (low values of Centrifugable Solids), small Particle Size, and low viscosity at high levels of % Polymer. Note that, with regard to free rise foam properties, the 25% IFD's of the Example foams are high when compared with the Control polymer polyol considering the % Polymer. This is most evident when Example 3 is compared to the Control. The viscosity of the product in Example 3 is less than 4,000 cks at 42.4% Polymer, while the control has a viscosity of 6900 cks. at 43.2% Polymer. When the product of Example 3 was foamed at 40.7% Polymer and compared to the control, foamed at 43.2% Polymer, the Example 3 product had a 25% IFD within the experimental error of the Control.

TABLE 1

| Example No. | Control | 1 1st. | 1 2nd. | 2 1st. | 2 2nd. | 3 1st. | 3 2nd. | 4 1st. | 4 2nd. | 5 1st. | 5 2nd. |
|---|---|---|---|---|---|---|---|---|---|---|---|
| Reaction Temp. C. | 125 | 125 | 125 | 125 | 125 | 125 | 125 | 125 | 125 | 125 | 125 |
| Wt. % Catalyst in Feed | 0.6 | 0.4 | 0.6 | 0.4 | 0.6 | 0.3 | 0.3 | 0.6 | 0.6 | 0.8 | 0.6 |
| Polymer Control Agent | ISOP | ISOP | ISOP | ISOP | ISOP | ISOP | ISOP | ISOP | — | ISOP | ISOP |
| Wt. % PCA in Feed | 2 | 1.7 | 1 | 1.7 | 1 | 3 | 3 | 2.0 | — | 3 | 3.9 |
| Wt. % Monomers in Feed | 44.3 | 11.3 | 33.3 | 11.3 | 33 | 15 | 33 | 15.0 | 15.0 | 12 | 39 |
| Monomer Type | A/S | A/S | A/S | A/S | A/S | A/S | A/S | A/S | A/S | A/S | A/S |
| Ratio of Monomers | 30/70 | 30/70 | 30/70 | 30/70 | 30/70 | 30/70 | 30/70 | 30/70 | 30/70 | 30/70 | 30/70 |
| Polyol Type | I | I | — | I | — | I | — | II | — | I | I |
| Wt. % Polyol and Stabilizer | — | 100 | — | 100 | — | 100 | — | 100 | — | 53 | 47 |
| Wt. % Stabilizer in Polyol Mix | 10 | 4.4 | 7.2 | 4.4 | — | 4.0 | — | 10.0 | — | 10.7 | — |
| Total Stabilizer, % | — | | 11.6 | | 4.4 | — | 4.0 | — | 10.0 | — | 6 |
| Residence Time, minutes | 12 | 12 | 12 | 12 | 12 | 12 | 12 | 12 | 12 | 12 | 12 |
| Wt. % Polymer | 43.4 | | 38.4 | | 36.3 | | 42.4 | | 28.8 | | 43.7 |
| Viscosity, cks | 6901 | | 4847 | | 3160 | | 3987 | | 4068 | | 5991 |
| XLC | 2.5 | | 1.6 | | 3 | | — | | 3.8 | | |
| Centrifugable Solids, Wt. % | 4.9 | | 3.4 | | 3.2 | | 2.4 | | 2.3 | | 6.9 |
| Mean Particle Size, microns | 1.49 | | 1.06 | | 1.05 | | 1.11 | | 62 | | 1.42 |
| Foam Evaluation 25% IFD, pol | 140 | | 115 | | 110 | | 132 (40.7 wt. % Polymer) | | | | 139 (41 wt. % Polymer) |

EXAMPLE 4

Example 4, the parameters and results of which are also shown in Table 1, illustrates the invention using a higher molecular weight polyol. In this case, the resulting Particle Size is very low, 0.6 microns, as a result of the novel process combined with known effects derived from high molecular weight polyols.

EXAMPLE 5

In Example 5, shown in Table 1, 50 parts of Polyol I, 6 parts of Stabilizer A, 2 parts of isopropanol, and 0.56 parts of AIBN were fed continuously to the stirred, back mixed reactor, along with 8 parts of a 30/70 mixture of acrylonitrile and styrene. The residence time was 12 minutes and the reaction temperature was 125° C. The product from the "first" reactor was collected and not stripped of residual monomer. 66.56 parts of this product, along with 44 parts of Polyol I, 7.7 parts of isopropanol, 1.2 parts of AIBN, and 76.3 parts of a 30/70 mixture of acrylonitrile and styrene, were fed continuously to the "second" reactor and treated using the same residence time and temperature as in the first reactor. The product of this second reactor was collected and stripped of residual monomer, as described above. The final product contained 43.7% polymer, had a viscosity of 5991 cks, centrifugable solids of 6.9%, and a mean particle size of 1.42. When foamed at 41% polymer, using the formulation of Table A, the 25% IFD of the resultant foam was 139 psi.

A slightly majority of the polyol, 53%, was fed to the first reactor and the balance to the second reactor in this Example. Comparing the product data and foam data with the control and Examples 1 through 3, this Example illustrates that the advantages of this novel process, particularly low viscosity, are achieved even when the amount of polyol fed to the first reactor is near its lower limit of 50%.

One of skill in the art will recognize that many modifications may be made to the present invention without departing from the spirit and scope of the present invention. The embodiment described herein is means to be illustrative only and should not be taken as limiting the invention, which is defined in the following claims.

We claim:

1. A method for producing a stable, low viscosity polymer polyol comprising the steps of
   (1) producing a first reaction product by polymerizing a first feed in a first continuous reactor in the presence of an initiator, said first feed comprising less than about 50 wt % of a total monomer proportion in at least about 50 wt % of a total base polyol proportion;
   (2) producing a second reaction product by polymerizing a second feed in a continuous reactor in the presence of an initiator, said second feed comprising: (a) said first reaction product; (b) at least about 50 wt % of said total monomer proportion; and (c) any balance of said base polyol proportion.

2. The method of claim 1 wherein said first feed further comprises one or more component selected from the group consisting of a precursor stabilizer and a polymer control agent.

3. The method of claim 2 wherein said second feed further comprises one or more component selected from the group consisting of a precursor stabilizer and a polymer control agent.

4. The method of claim 1 wherein said first feed comprises (a) from less than about 33 wt % of said total monomer proportion in (b) at least about 50 wt % of said base polyol.

5. The method of claim 3 wherein said first feed comprises (a) from less than about 33 wt % of said total monomer proportion in (b) at least about 50 wt % of said base polyol.

6. The method of claim 1 wherein said monomer comprises a mixture of greater than about 50:50 wt % styrene to an ethylenically unsaturated comonomer comprising acrylonitrile.

7. The method of claim 2 wherein said monomer comprises a mixture of greater than about 50:50 wt % styrene to an ethylenically unsaturated comonomer comprising acrylonitrile.

8. The method of claim 3 wherein said monomer comprises a mixture of greater than about 50:50 wt % styrene to an ethylenically unsaturated comonomer comprising acrylonitrile.

9. The method of claim 4 wherein said monomer comprises a mixture of greater than about 50:50 wt % styrene to an ethylenically unsaturated comonomer comprising acrylonitrile.

10. The method of claim 5 wherein said monomer comprises a mixture of greater than about 50:50 wt % styrene to an ethylenically unsaturated comonomer comprising acrylonitrile.

11. The method of claim 2 wherein said precursor stabilizer is an adduct of an unsaturated compound with a polyol, and wherein said stabilizer contains unsaturation that copolymerizes with said monomer.

12. The method of claim 5 wherein said precursor stabilizer is an adduct of an unsaturated compound with a polyol, and wherein said stabilizer contains unsaturation that copolymerizes with said monomer.

13. The method of claim 10 wherein said precursor stabilizer is an adduct of an unsaturated compound with a polyol, and wherein said stabilizer contains unsaturation that copolymerizes with said monomer.

14. A method for producing a stable, low viscosity polymer polyol comprising the steps of
   (1) producing a first reaction product by polymerizing a first feed in a first continuous reactor in the presence of an initiator, said first feed comprising: (a) less than about 50 wt % of total monomer proportion comprising a mixture of greater than about 50:50 wt % styrene to an ethylenically unsaturated comonomer comprising acrylonitrile; (b) in at least about 50 wt % of a total base polyol proportion; and, (c) one or more component selected from the group consisting of a precursor stabilizer and a polymer control agent;
   (2) producing a second reaction product by polymerizing a second feed in a continuous reactor in the presence of an initiator, said second feed comprising: (a) said first reaction product; (b) at least about 50 wt % of said total monomer proportion; (c) any balance of said base polyol proportion; and, (c) one or more component selected from the group consisting of a precursor stabilizer and a polymer control agent.

15. The method of claim 14 wherein said precursor stabilizer is an adduct of an unsaturated compound with a polyol, and wherein said stabilizer contains unsaturation that copolymerizes with said monomer.

* * * * *